United States Patent
Baxter, Jr. et al.

(10) Patent No.: US 6,626,053 B2
(45) Date of Patent: Sep. 30, 2003

(54) MOTOR VEHICLE TORQUE TRANSFER CASE PUMP DRIVE

(75) Inventors: Ralph W. Baxter, Jr., Fort Wayne, IN (US); Wesley M. Dick, Fort Wayne, IN (US)

(73) Assignee: Opker Technology, Inc., Fort Wayne, IN (US)

(*) Notice: Subject to any disclaimer, the term of this patent is extended or adjusted under 35 U.S.C. 154(b) by 0 days.

(21) Appl. No.: 09/956,170

(22) Filed: Sep. 19, 2001

(65) Prior Publication Data

US 2002/0011369 A1 Jan. 31, 2002

Related U.S. Application Data

(63) Continuation of application No. 09/021,363, filed on Feb. 10, 1998, now abandoned.

(51) Int. Cl.[7] ............................ F16H 37/08; B60K 17/34
(52) U.S. Cl. ...................... 74/15.86; 74/15.88; 180/247
(58) Field of Search .............................. 74/15.86, 15.88; 180/247

(56) References Cited

U.S. PATENT DOCUMENTS

| | | | | |
|---|---|---|---|---|
| 3,019,742 A | * | 2/1962 | Kershaw | ..................... 105/177 |
| 3,046,813 A | * | 7/1962 | Bixby | ........................ 192/218 |
| 3,902,667 A | * | 9/1975 | Jackson | ...................... 137/899 |
| 4,260,107 A | * | 4/1981 | Jackson | ...................... 239/124 |
| 4,368,802 A | * | 1/1983 | Grabill et al. | ............. 184/6.12 |
| 4,542,801 A | * | 9/1985 | Richards et al. | ............ 180/235 |
| 4,610,175 A | * | 9/1986 | Weis et al. | ...................... 74/11 |
| 4,935,984 A | * | 6/1990 | Bryant et al. | ........... 134/167 C |
| 5,022,478 A | * | 6/1991 | Hartmann | ................... 180/53.1 |
| 5,197,423 A | | 3/1993 | Ebesu et al. | |
| 5,557,931 A | | 9/1996 | Hauser et al. | |
| 5,588,325 A | | 12/1996 | Green et al. | |
| 5,775,608 A | * | 7/1998 | Dumaine et al. | ........... 241/242 |

* cited by examiner

*Primary Examiner*—David Fenstermacher
(74) *Attorney, Agent, or Firm*—Hahn Loeser & Parks LLP; Robert J. Clark; Michael H Minns

(57) ABSTRACT

A motor vehicle torque transfer case pump drive which is mounted in the front of a torque transfer case where it mounts to a motor vehicle transmission and includes a drive arrangement, such as a chain drive, a belt drive or a gear drive. This permits an auxiliary hydraulic pump to be driven directly from the torque transfer case, thus eliminating the need for a power take-off (PTO) adapter to drive the auxiliary hydraulic pump.

3 Claims, 2 Drawing Sheets

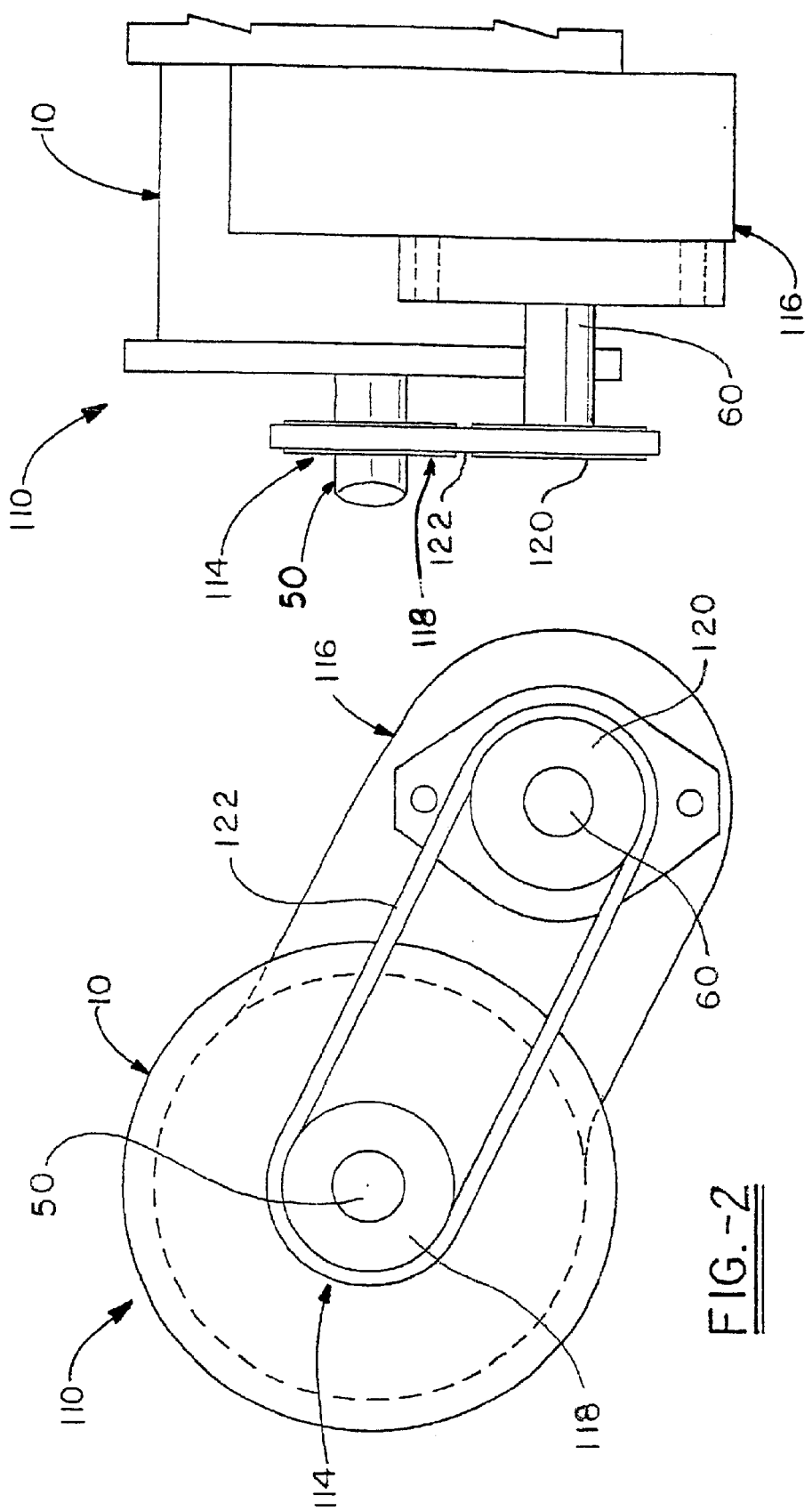

MOTOR VEHICLE TORQUE TRANSFER CASE PUMP DRIVE

This application is a continuation of Ser. No. 09/021,363 filed Feb. 10, 1998, now abandoned.

BACKGROUND AND SUMMARY OF THE INVENTION

The present invention relates generally to a new and novel motor vehicle torque transfer case pump drive. More particularly, the present invention relates to a new and novel auxiliary hydraulic pump drive which is mounted in the front of a torque transfer case where it mounts to a motor vehicle transmission and includes a drive arrangement, such as a chain drive, a belt drive or a gear drive, to allow the auxiliary hydraulic pump to be driven directly from the torque transfer case, thus eliminating the requirement for a power take-off (PTO) adapter to drive the auxiliary hydraulic pump.

Four-wheel drive motor vehicles are becoming increasingly popular. Recently, certain motor vehicles have been provided with "full-time" four-wheel drive systems. In such "full-time" four-wheel drive systems, the torque transfer cases are typically provided with an interaxle differential for dividing torque between the front wheels and the rear wheels of the motor vehicle. The interaxle differential enables the front wheels and the rear wheels to rotate at different speeds, which occurs during normal turning of the motor vehicle or in the event that the front wheels and the rear wheels have tires with different diameters. However, to prevent excessive relative slipping between the front wheels and the rear wheels, as might occur when one set of wheels encounters a low-traction condition, such as ice, these torque transfer cases typically include a selectively engageable clutch which is operative to lock the interaxle differential upon sensing a predetermined amount of relative slippage between the front output shaft and the rear output shaft of the torque transfer case. Locking of the interaxle differential prevents any further relative overrun or differentiation between the front output shaft and the rear output shaft of the torque transfer case.

Known prior "full-time" four-wheel drive systems have generally required a power take-off (PTO) adapter to drive an auxiliary hydraulic pump. Inclusion of a power take-off (PTO) adapter complicates the packaging of the torque transfer case in the motor vehicle and can have a negative impact on the cost and reliability of such torque transfer cases. In addition, in some motor vehicle applications, insufficient clearance is present to allow the use of a power take-off (PTO) adapter and thus the use auxiliary hydraulic pump is generally precluded in such situations.

A preferred embodiment of the present invention is, therefore, directed to a motor vehicle torque transfer case pump drive which is mounted in the front of a torque transfer case where it mounts to a motor vehicle transmission and includes a drive arrangement, such as a chain drive, a belt drive or a gear drive. This permits an auxiliary hydraulic pump to be driven directly from the torque transfer case, thus eliminating the need for a power take-off (PTO) adapter to drive the auxiliary hydraulic pump. The elimination of the need for a power take-off (PTO) simplifies the packaging of the torque transfer case in the motor vehicle and allows use of a hydraulic pump in applications where the power take-off (PTO) adapter has clearance issues in the motor vehicle. Alternatively, the transmission to torque transfer case adapter can be combined with the motor vehicle torque transfer case pump drive. The output connection would preferably use a standard SAE hydraulic pump mount which would facilitate placement of the hydraulic pump at a location that best fits the motor vehicle application without the added cost and mounting problems associated with a power take-off (PTO) adapter.

Other advantages and novel features of the present invention will become apparent in the following detailed description of the invention when considered in conjunction with the accompanying drawings.

BRIEF DESCRIPTION OF THE DRAWINGS

FIG. 2 is a front elevational view of the motor vehicle torque transfer case pump drive in accordance with the present invention shown in FIG. 1.

FIG. 3 is a side elevational view of the motor vehicle torque transfer case pump drive in accordance with the present invention shown in FIG. 1.

DETAILED DESCRIPTION OF THE DRAWINGS

Figure 1:
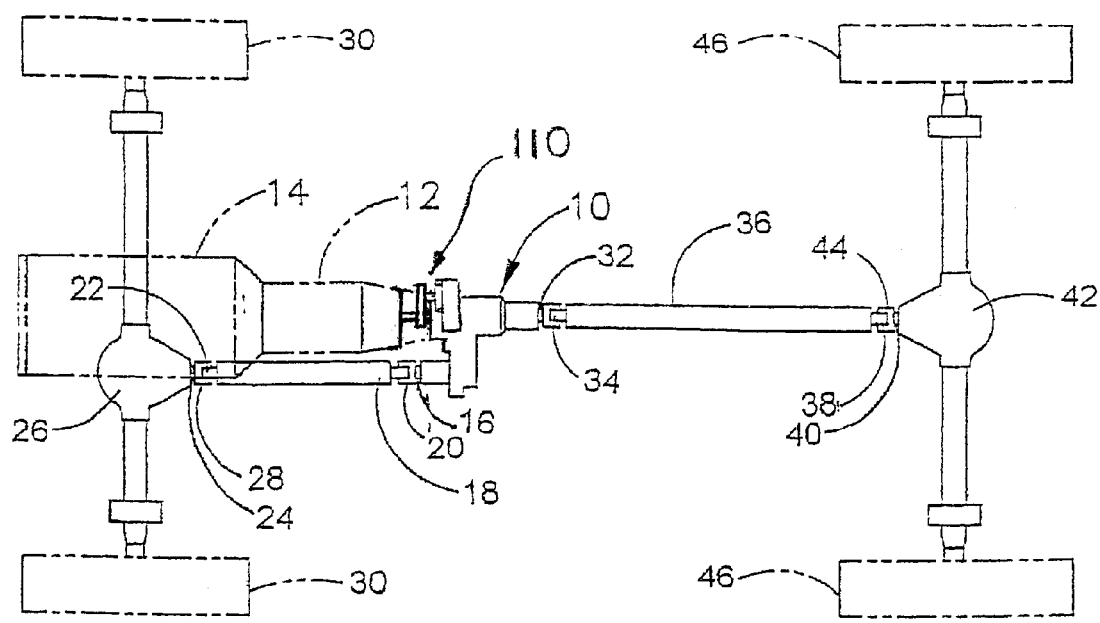
FIG. 1 illustrates a top plan schematic view of a typical motor vehicle having a four-wheel drive system which incorporates a torque transfer case pump drive in accordance with the present invention.

In the following detailed description of preferred embodiments of the present invention, reference is made to the accompanying drawings which, in conjunction with this detailed description, illustrate and describe a preferred embodiment of a motor vehicle torque transfer case pump drive, generally identified by reference number 110, in accordance with the present invention. Referring now to the drawings, in which like-referenced characters indicate corresponding elements throughout the several views, attention is first directed to FIG. 1, which illustrates a top plan schematic view of a typical motor vehicle having a four-wheel drive system which incorporates a torque transfer case pump drive 110 in accordance with the present invention. Torque transfer case 10 is coupled with motor vehicle transmission 12 of conventional design which, in turn, is coupled to motor vehicle drive engine 14. Motor vehicle torque transfer case pump drive 110 is mounted in the front of torque transfer case 10 where it mounts to the motor vehicle transmission 12 as will be described in greater detail below. Torque transfer case 10 generally includes a first or front torque output shaft 16, which is connected to the rearward end of motor vehicle front axle drive shaft 18 via universal joint coupling 20 of conventional design. Forward end 22 of motor vehicle front axle drive shaft 18 is coupled to input shaft or yoke 24 of motor vehicle front differential unit 26 via universal joint coupling 28 of conventional design. Motor vehicle front differential unit 26 is adapted to divide torque from motor vehicle front axle drive shaft 18 to front wheels 30 of the motor vehicle. Torque transfer case 10 also includes second or rear torque output shaft 32 which is drivingly connected to forward end 34 of motor vehicle rear axle drive shaft 36 of conventional design. Motor vehicle rear axle drive shaft 36 has rearward end 38 connected to input shaft or yoke 40 of motor vehicle rear differential unit 42 via universal joint coupling 44 of conventional design. Motor vehicle rear differential unit 42 is adapted to divide torque received from motor vehicle rear axle drive shaft 36 between rear wheels 46 of the motor vehicle.

Turning now to FIGS. 2 and 3, which illustrate a front elevational view of motor vehicle torque transfer case pump 110 in accordance with a preferred embodiment of the present invention and a side elevational view of motor vehicle torque transfer case pump drive 110 in accordance with a preferred embodiment of the present invention, respectively. Motor vehicle torque transfer case pump drive 110 is preferably mounted in the front of torque transfer case 10 where it mounts to the motor vehicle transmission 12. The input shaft 50 to the transfer case 10 from the transmission 12 provides the power in the transfer case pump drive 110. Accordingly, motor vehicle torque transfer case pump drive 110 preferably includes drive arrangement 114, such as a chain drive, a belt drive or a gear drive, allowing auxiliary hydraulic pump 116 to be driven from input shaft 50 of torque transfer case 10. Drive arrangement 114 includes pulley 118 rotatably connected to input shaft 50 of torque transfer case 10, pulley 120 rotatably connected to a drive shaft 60 of the auxiliary hydraulic pump 116, and belt 122 rotatably connecting pulley 118 and pulley 120 to transfer rotational power from pulley 118 to pulley 120. This allows auxiliary hydraulic pump 116 to be driven directly from transfer case 10, thus eliminating the requirement for a power take-off (PTO) adapter to drive the auxiliary hydraulic pump. This elimination of the need for a power take-off (PTO) adapter simplifies the packaging of the torque transfer case in the motor vehicle and allows use of an auxiliary hydraulic pump in applications where the power take-off (PTO) adapter has clearance issues in the motor vehicle.

Alternatively, the motor vehicle transmission 12 to torque transfer case 10 adapter could be combined with motor vehicle torque transfer case pump drive 110. The output connection would preferably use a standard SAE hydraulic pump mount which would facilitate placement of auxiliary hydraulic pump 116 at a location that best fits the motor vehicle application without the (PTO) adapter.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A motor vehicle transfer case pump drive comprising:

a transfer case having an input shaft providing rotational power to the transfer case;

a drive arrangement which drives a pump directly from the input shaft of the torque transfer case wherein the pump is mounted directly to the transfer case and wherein the input shaft extends from a transmission, through the drive arrangement, and into the transfer case.

2. The motor vehicle transfer case pump drive of claim 1, wherein the drive arrangement comprises a first pulley mounted on the input shaft of the transfer case, a second pulley mounted on a drive shaft of the pump; and a belt providing rotational power from the first pulley mounted on the input shaft of the transfer case to the second pulley mounted on the drive shaft of the pump.

3. A motor vehicle torque transfer case pump drive comprising:

a transfer case having an input shaft;

a first pulley mounted on the input shaft of the transfer case, the input shaft extending from a transmission, through the first pulley, and into the transfer case;

a pump mounted directly to the transfer case;

a second pulley mounted on a drive shaft of the pump; and a belt providing rotational power from the first pulley mounted on the input shaft of the transfer case to the second pulley mounted on the drive shaft of the pump.

* * * * *

UNITED STATES PATENT AND TRADEMARK OFFICE
CERTIFICATE OF CORRECTION

PATENT NO. : 6,626,053 B2
DATED : September 30, 2003
INVENTOR(S) : Ralph W. Baxter, Jr. and Wesley M. Dick It is certified that error appears in the above-identified patent and that said Letters Patent is hereby corrected as shown below:

<u>Title page,</u>
Item [73], Assignee, replace "Opker Technology, Inc." with
-- Spicer Technology, Inc. --.

Signed and Sealed this

Sixth Day of April, 2004

JON W. DUDAS
*Acting Director of the United States Patent and Trademark Office*